United States Patent [19]
Pehlert et al.

[11] Patent Number: 5,409,774
[45] Date of Patent: Apr. 25, 1995

[54] HCFC RESISTANT ABS COMPOSITE

[75] Inventors: Craig W. Pehlert, Worcester; Paul J. Drenzek, Ware, both of Mass.; Glenn B. Hilton, Somers, Conn.

[73] Assignee: Monsanto Company, St. Louis, Mo.

[21] Appl. No.: 82,892

[22] Filed: Jul. 1, 1993

Related U.S. Application Data

[63] Continuation-in-part of Ser. No. 912,505, Jul. 13, 1992, abandoned.

[51] Int. Cl.$^6$ .................. B32B 3/26; B32B 27/00; B32B 27/08
[52] U.S. Cl. .................. 428/305.5; 428/304.4; 428/319.3; 428/319.7; 428/519; 428/520
[58] Field of Search .............. 428/304.4, 317.9, 319.7, 428/519, 520, 305.5, 319.3

[56] References Cited

U.S. PATENT DOCUMENTS

| | | | |
|---|---|---|---|
| 3,862,880 | 1/1975 | Feldman | 428/319.9 |
| 3,911,190 | 10/1975 | Myers et al. | 428/315 |
| 4,005,919 | 2/1977 | Hoge et al. | 428/315 |
| 4,101,702 | 7/1978 | Churchill et al. | |
| 5,227,245 | 7/1993 | Brands et al. | 428/483 |

FOREIGN PATENT DOCUMENTS

| | | | |
|---|---|---|---|
| 0101214 | 2/1984 | European Pat. Off. | |
| 0572720 | 12/1993 | European Pat. Off. | C08L 51/04 |
| 517658 | 1/1993 | Japan | |
| 1505300 | 3/1978 | United Kingdom | |
| WO9313168 | 7/1993 | WIPO | C08L 25/00 |

OTHER PUBLICATIONS

"HCFC Blown Rigid Polyurethane Foams and Refrigerator Liner Materials: The Search for Compatible Systems"; Potter et al.; Polyurethanes World Congress 1991; Sep. 24-26, 1991; pp. 560-570.

Swartzmiller, S. B. et al., "The Compatibility of Styrenic Refrigeration Liners wit HCFC Blown Polyurethane Foam" The Dow Chemical Company, (publication date unknown but assumed to be about 1990).

Swartzmiller, Steven B. Krawczyk, L. S. and Cooper, L. A.; "Compatibilty Study of Plastic Refrigerator Liners with CFC and HCFC Brown Foams"; Proceeding of the SPI-33rd Annual Technical/Marketing Conference, Orlando, Fla., (Sep./Oct. 1990).

Grünbauer, H. J. M. et al., "Novel Polyurethane/Plastic Liner Technology for HCFC -Blown Appliance Foams", Polyurethanes World Congress 1991 (Sep. 1991), pp. 571 to 578.

Morgenstern, H., "HCFC-Resistant Materials for Refrigeration Liners", Polyurethanes World Congress 1991 (Sep. 1991), pp. 592 to 597.

*Primary Examiner*—George F. Lesmes
*Assistant Examiner*—Terrel Morris
*Attorney, Agent, or Firm*—William J. Farrington; Mark F. Wachter

[57] ABSTRACT

Disclosed herein is a composite structure comprising a layer of a gas filled cellular insulation material combined with a layer of impact resistant thermoplastic sheet material wherein an ABS sheet having a substantial number of rubber particles in range of from about 4 to about 10 microns (LR ABS) is interposed between the gas filled cellular material and the thermoplastic sheet.

13 Claims, 1 Drawing Sheet

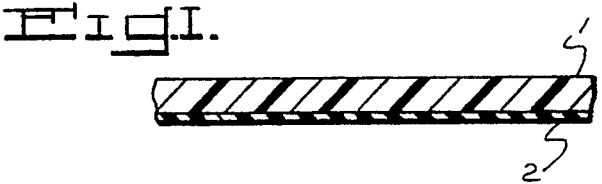
Fig.I.
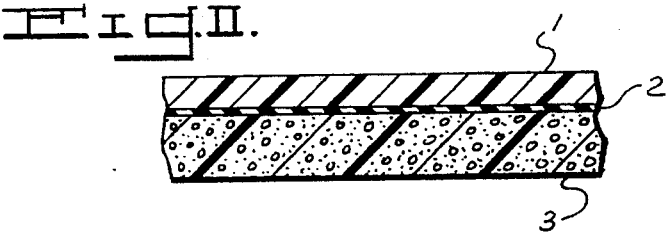
Fig.II.
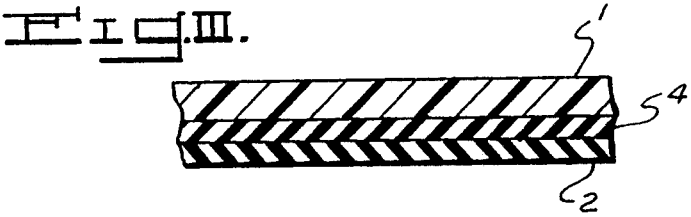
Fig.III.

HCFC RESISTANT ABS COMPOSITE

This application is a continuation in part of Ser. No. 07/912,505 filed Jul. 13, 1992 now abandoned.

BACKGROUND OF THE INVENTION

1. Field of the Invention

The present invention relates to composite structures comprising a layer of a gas filled cellular material, a layer of an ABS sheet having a substantial number of rubber particles in the range of from about 4 to about 10 microns and a layer of a thermoplastic polymer such as ABS.

2. Description of the Prior Art

Composite structures comprising a cellular insulation material bonded to a thermoplastic sheet are commonly prepared by foaming-in-place techniques. The resulting composite structure is used in a wide variety of applications to provide thermal insulation, acoustical insulation and in certain applications buoyancy. Examples of these applications include refrigerator construction, boat hulls, panels for recreation vehicles, door panels, wall panels, headliners for sea and air vehicles, etc. Generally the thermoplastic sheet is presented as the exterior surface of the composite while the cellular insulation material is hidden from view in the end use application.

In most of these composite structures for refrigeration use, gas filled polyurethane foam is used as the cellular insulation material and acrylonitrile-butadiene-styrene (ABS) polymer or rubber modified polystyrene is used as the thermoplastic sheet material. However, other thermoplastic polymeric sheet materials can be used as is discussed in greater detail below. The gas found in the cells of the insulation material is usually an aliphatic or cycloaliphatic chlorofluorocarbon (CFC's). These gases are present in the cells of the cellular insulation material as residual blowing agents. Alternately, they are incorporated into the cells by design in order to improve the thermal insulation properties of the cellular material. Examples of these fluorochlorocarbons include trichlorofluoromethane, dichlorodifluoromethane, 1,1,2-trichloro-1,2,2-trifluoroethane, octafluorocyclobutane, and mixtures thereof. Recently, the above fluorocarbons are being replaced with hydrochlorofluorocarbons (HCFC's) such as dichlorotrifluoroethane (HCFC 123), dichlorofluoroethane (HCFC 141b), chlorodifluoromethane (HCFC 22), chlorodifluoroethane (HCFC 142b) and tetrafluoroethane (HCFC 134a).

Fully halogenated chlorofluorocarbons [such as trichlorofluoromethane ($CFCl_3$) or chlorofluorocarbon (CFC)-11] are extremely stable and break down only when they have reached the ozone layer, where ultraviolet radiation breaks them down causing the release of chlorine radicals. The chlorine radicals are believed to react with ozone to form oxygen thereby reducing the ozone in the stratosphere. HCFC's are CFC's containing at least one hydrogen atom. These appear as a desirable replacement for the CFC's in that they break down more readily in the troposphere or lower atmosphere. Therefore, they have less ozone depletion potential. Yet, HCFC's are more aggressive than CFC's towards high impact polystyrene (HIPS) and ABS resins.

Accordingly, the composites described above suffer from a disadvantage in that the thermoplastic sheet becomes less impact resistant and more susceptible to cracking when bonded to an HCFC filled foam. The loss of impact resistance and the tendency to crack is reduced by the use of an elastomeric layer between the gas filled foam and the ABS as taught in U.S. Pat. No. 3,563,845 to J. Stevens. In U.S. Pat. No. 3,565,746, the same patentee teaches the use of three-layer systems comprised of an organic, rigid polymeric solid layer, such as a graft copolymer blend of a monovinyl aromatic compound, an alpha-electronegatively substituted ethene, and a conjugated alkadiene; and two different layers of gas filled cellular material. The gas-filled cellular material layers differ in density and compressive modulus in order to achieve improved impact resistance. Other methods used in the art to preserve the impact strength of the ABS layer include the use of a high nitrile resin layer, a wax layer or a layer of polyethylene between the cellular material and the ABS.

The methods described above provide some improvement in the retention of impact resistance of the thermoplastic sheet laminated to the gas filled cellular material. However, the impact resistance of the thermoplastic sheet may still deteriorate due to the accelerated aging of the layers which are interposed between the cellular material and the thermoplastic sheet. In addition, the HCFC in the cellular material may permeate the intermediate layers and attack the thermoplastic sheet. In either event the result is a decrease in impact strength of the thermoplastic sheet in the composite structure.

A need exists in the art for improved composite structures wherein the thermoplastic sheet component is protected against the halogenated carbons and hydrocarbons and especially the HCFC's found in the cellular insulation material bonded to the thermoplastic sheet while maintaining the rigidity and impact strength of the composite structure.

A need also exists for improved composite structures for use as refrigerator liners which will resist attack by the HCFC's.

SUMMARY OF THE PRESENT INVENTION

The present invention relates to improved composite structures, especially for use as refrigerator liners, comprising (1) a sheet of a thermoplastic material, e.g., ABS, which is the cap layer in laminar contact with (2) an ABS layer which is the substrate layer having a substantial number of rubber particles in the range of from about 4 to about 10 microns, which in turn is in laminar contact with (3) a cellular insulation material wherein a major amount of the cells in the insulation material are filled with a halogenated aliphatic or cycloaliphatic carbon (CFC) or hydrocarbon (HCFC).

The present invention also relates to an improvement in the process for preparing a composite structure of a sheet of a thermoplastic material, e.g., ABS, and a layer of gas filled cellular insulation material wherein a major amount of the cells in the insulation material are filled with a halogenated aliphatic or cycloaliphatic carbon or hydrocarbon, the improvement which comprises using a sheet of a thermoplastic material which has laminated thereto a coextensive sheet of an ABS layer having a substantial number of rubber particles in the range from about 4 to about 10 microns. ABS materials and methods for measuring particle size are well known in the art and are taught in the following U.S. Pat. Nos.: 4,713,420 to Henton; 4,430,478 to Schmitt et al.; 4,277,574 to Jastrzebski et al.; 4,017,559 to Deets et al.; 3,931,356 to Dalton; 3,928,495 to Dalton; 3,905,238 to Aubrey et al.; 3,905,237 to Aubrey; 3,903,200 to Cincera; 3,903,199 to Dalton; 3,825,621 to Ford; 3,663,656 to Ford et al.; 3,652,721 to Dalton et al.; and 3,576,910 to Jastrzebski. The rubber phase particle size distribution of the rubber component of the ABS may be mono or multimodal using small (i.e., less than 0.5 microns), medium (i.e., 0.5 to 1.5 microns), and/or large (i.e., greater than 1.5 microns) rubber particles. It is generally known that ABS with a smaller rubber particle size (i.e., less than one micron) provides glossy surfaces in molded articles. Such glossy surfaces are desirable as the interior portion or door liner of a refrigerator.

Rubber particle size distribution, as reported herein, was determined according to the technique detailed in Hoffman, *An Improved Technique for Particle Size Measurement*, Journal of Colloid and Interface Science, Vol. 143, No. 1 (April 1991). The instrument used to determine particle size was a Horiba centrifugal particle size distribution analyzer, Model CAPA 500. The Horiba centrifuge disk was operated at 480 rpm to measure larger particles and at higher speeds to measure smaller particles. The rubber particles were dispersed at 5 to 10 weight percent of the ABS to be measured in propylene carbonate. The rubber phase particle size (RPPS) distribution is reported as weight average particle size diameter (Dw) in microns. Thus, an RPPS value of 5 microns means that in a given sample, about 50 weight percent of the particles are greater than 5 microns and about 50 weight percent are less than 5 microns in size.

DESCRIPTION OF THE DRAWINGS

FIG. 1 illustrates a cross section of a composite structure of the present invention wherein a thermoplastic sheet (1) the cap layer is bonded to an ABS substrate layer having a substantial number of rubber particles in the range of from about 4 to about 10 microns (2).

FIG. 2 illustrates a cross section of a composite structure prepared from a thermoplastic sheet (1) the cap layer which is bonded to an ABS substrate layer having a substantial number of rubber particles in the range of from about 4 to about 10 microns (2) which in turn is bonded to a layer of cellular material (3).

FIG. 3 illustrates a cross section of a composite structure prepared from a thermoplastic sheet (1) cap layer which is bonded to a material obtained by regrind of a composite of a thermoplastic material and an ABS having a substantial number of rubber particles in the range of from about 4 to about 10 microns (4) which in turn is bonded to an ABS substrate layer having a substantial number of rubber particles in the range of from about 4 to about 10 microns (2).

DESCRIPTION OF THE PREFERRED EMBODIMENTS

A—THE FOAM COMPONENT

Normally, the preferred cellular material used in the composites of the present invention is polyurethane foam, although other similar cellular materials can be used. The halogenated aliphatic or cycloaliphatic carbons or hydrocarbons found in the cells are the residue of blowing agents or else are deliberately placed in the cells to enhance the thermal insulation properties of the cellular material. Examples of these halogenated carbons or hydrocarbons include trichloro-monofluoromethane, dichlorodifluoromethane, mono-chlorotrifluoromethane, monobromotrifluoromethane, tetrabromofluoropropane, monochlorodifluoromethane, trichlorodifluoroethane, trichlorotrifluoroethane, dichlorotetrafluoroethane, tetrachlorodifluoroethane, octafluorocyclobutane, and HCFC's, such as HCFC 123, 141b, 22, 142b, 134a, etc. Mixtures of the foregoing halogenated hydrocarbons and HCFC's are also used. Also contemplated for use in the present invention are foamed components which have been foamed with non-halogenated blowing agents such as cyclopentene, cyclopentane and the like.

B—THE THERMOPLASTIC SHEET COMPONENT

The preferred thermoplastic sheet material, for use in refrigerator liners, is an acrylonitrile-butadiene-styrene (ABS) polymer which contains from 5 to 30% by weight of a diene rubber based on the total weight of the ABS polymer. The graft and matrix phases of the ABS polymer contain from 5 to 40% by weight of acrylonitrile and from 95 to 60% by weight of styrene based on the total weight of the acrylonitrile and styrene components. The expression ABS is used in the generic sense and includes the known equivalents for acrylonitrile (e.g. methacrylonitrile, propacrylonitrile, etc.), butadiene (e.g. isoprene, chloroprene, etc.) and styrene (e.g. alpha-methyl styrene, halostyrene, etc.). The graft and matrix portions of the ABS polymer may optionally contain up to 40% by weight based on the total weight of the ABS polymer of an additional monomer such as acrylate or methacrylate. Preferably, the ABS sheet used as the refrigeration liner is a high gloss, high impact material of the type conventionally used for glossy exterior surfaces. The ABS sheet materials used to prepare the refrigerator liners used as the thermoplastic sheet component or cap layer of the composites of the present invention are well known to those skilled in the art.

Other thermoplastic materials which can be used as the cap layer in the present invention as the thermoplastic sheet component include polyvinyl chloride, polycarbonate, polymethyl methacrylate, etc. providing that such materials are not adversely effected by exposure to halogenated hydrocarbons and further that these other thermoplastic materials will adhere to the ABS which is laminated to the foam and referred to herein as the large rubber ABS (LR ABS).

C—THE LARGE RUBBER ABS COMPONENT

The ABS substrate layer having a substantial number of rubber particles in the range of from about 4 to about 10 microns (hereinafter LR ABS) is similar to the ABS conventionally used as the thermoplastic sheet material in refrigerator liners (hereinafter SR ABS), except that the SR ABS sheet material used as the cap layer has a smaller average RPPS usually in the range of from about 0.1 to less than about 2 microns, preferably less than 1.5 microns. The LR ABS substrate layer exhibits increased resistance to halogenated hydrocarbons, but is characterized as having low gloss in addition to reduced modulus and reduced yield stress, as compared to the SR ABS sheet material. Consequently, it is unsuitable for use alone as a refrigerator liner as it lacks the gloss modulus and yield stress required in liners.

The graft and matrix phases of the LR ABS used in the present invention contain from about 15 to about less than 45% by weight, preferably from about 20 to about 40% by weight, and more preferably from 25 to 40% by weight of a nitrile monomer unit, and from more than 55 to about 85% by weight, preferably from about 60 to about 80% by weight, and more preferably from about 75 to about 60% by weight of styrene, based on the total weight of the nitrile and styrene components in the graft and matrix phases, wherein the weight percent of nitrile monomer is calculated as acrylonitrile. Preferably, the overall amount of nitrile monomer unit in the graft and in the matrix phases of the LR ABS will be less than 40% by weight but allowing for the use of a matrix containing up to about 45% by weight.

The LR ABS contains from about 5 to about 30% and more preferably from about 7.5 to about 25% by weight of a synthetic or natural diene rubber component such as polybutadiene, polyisoprene, neoprene, etc. These rubbers may be wholly or partially replaced by nitrile rubbers, acrylate rubbers, natural rubbers, acrylonitrile-butadiene copolymers, ethylene-propylene copolymers, chlorinated rubber, etc. The preferred rubbers are diene homopolymers and copolymers wherein the preferred comonomers are styrene, acrylonitrile and the like. The percent rubber referred to above is that of the rubber substrate based on the total LR ABS polymer composition.

The SR ABS and LR ABS components of the present invention are prepared by any of the methods which are well known to those skilled in the art, with the preferred method being a graft polymerization process. The SR ABS is preferably prepared by emulsion polymerization or combination of emulsion and suspension polymerization or other techniques which give smaller rubber particles and a more glossy surface in the molded ABS cap layer. The LR ABS is preferably prepared by polymerizing the styrene and acrylonitrile monomers in the presence of the rubber by suspension, bulk or mass polymerization methods. In particular, a preformed rubber substrate is dissolved in at least a portion of the monomers which form the graft and free matrix and the solution is polymerized so that at least a portion of the monomers are combined chemically or grafted onto the rubber substrate and a portion form ungrafted matrix. In a preferred embodiment, the graft polymerization is carried out so as to form occlusions of the SAN in the rubber particles of the LR ABS substrate layer. Depending upon the ratio of monomers to rubber substrate and polymerization conditions, it is possible to produce the desired RPPS; the desired degree of grafting of the monomers onto the rubber substrate; the desired amount of occlusions and, at the same time, polymerization of the monomers to form the ungrafted copolymer matrix.

Polyblends of two or more ABS copolymers may be used to prepare both the LR ABS and the SR ABS provided that the rubber particle sizes of each of the ABS components is in the specified ranges.

LR ABS and SR ABS suitable for use in the present invention are generally known in the art and both types are available from Monsanto Company under the name LUSTRAN® ABS.

D—THE SR ABS/LR ABS COMPOSITE

Preferably, the SR ABS sheet and the LR ABS sheet polymer are bonded together to form a unitary structure prior to forming the foam/LR ABS/SR ABS composite. This may be accomplished by laminating the SR ABS sheet to a sheet of the LR ABS using heat and pressure or by using suitable adhesives. Alternately, either the SR ABS component or the LR ABS component may be melt extruded onto a preformed sheet of the other component. In a preferred method the SR ABS cap and LR ABS substrate polymer components are co-extruded to form a composite. Other methods for forming composites will be obvious to those skilled in the art upon reading the present specification.

A significant amount of scrap material is generated during the manufacture of composite structures for use as refrigerator liners. This presents a potentially costly disposal problem where the components employed are typically non-compatible. Yet, in the present invention, where the SR ABS cap and LR ABS substrate layers are compatible, the scrap generated may be recycled and used in the LR ABS substrate or as a separate regrind layer between the SR ABS cap and the LR ABS substrate layers in the inventive composite structure. The percentage of either material in the regrind is inconsequential as far as compatibility is concerned and such regrind material may permit a reduction in the thickness of the SR ABS cap layer provided that the LR ABS containing the regrind material is resistant to the CFC's and/or HCFC's used in the foam component. The ability to effectively incorporate the regrind material results in a more cost-effective process and product.

Preferably, the thickness of the LR ABS/SR ABS composite structure is in the range of from about 500 to about 38,100 microns (20 to 1,500 mils), more preferably from about 500 to about 7,620 microns (20 to 300 mils) and most preferably from about 500 to about 5,080 microns (20 to 200 mils).

In the LR ABS/SR ABS composite, the relative thicknesses of the LR ABS substrate:SR ABS cap polymer components are in the range of from about 10:90 to about 95:5, preferably from about 30:70 to about 95:5. These ranges allow for the use of scrap material in the LR ABS and ease of fabrication when using lamination (heat and pressure), co-extrusion and bi-extrusion methods to form the LR ABS/SR ABS polymer assembly.

The SR ABS and LR ABS polymer components may be oriented or unoriented. There appears to be no advantage to using oriented materials and the use of unoriented materials is preferred to avoid any dimensional changes which may occur in the sheet upon loss of orientation during heating or processing while making the LR ABS/SR ABS composite.

The LR ABS/SR ABS polymer composites used in the present invention should have a bond strength sufficient to enable the composite to maintain its integrity during the construction operation, e.g., handling, assembly, foaming-in-place and thereafter without any substantial separation.

E—THE FOAM/LR ABS/SR ABS COMPOSITE

The foam member of the composite is usually prepared by foaming-in-place techniques. This involves positioning the SR ABS/LR ABS polymer composite in a suitable jig or mold. A foamable mixture is then introduced between the SR ABS/LR ABS composite and the wall of the jig or mold. The resulting foam adheres to the LR ABS polymer to provide an integral composite structure. In an optional embodiment, the foamable mixture is poured between the composite and a member such as enamelled steel, wood, plastic, etc. which forms an exterior surface on the other side of the foam opposite to the LR ABS.

The foam can be cured by conventional heating methods or by infrared or microwave heating methods if so desired. The foam bonds to the inside of the exterior portion and the LR ABS surface of the composite during this process and secures them in the spaced relationship thereby enabling a rigid structure of high strength to be obtained.

The preferred foamable or foaming composition is a polyurethane and the technique used for filling the space can be any of the conventional techniques used for filling spaces and voids in-situ. Examples of suitable compositions and techniques are described in "Rigid Plastic Foams" by T. H. Ferrigno, published by Reinhold Publishing Corp., second edition, 1967, pages 1–206.

Alternately, the foam can be laminated to the SR ABS/LR ABS polymer composite using suitable adhesives or melt adhesion techniques.

The bond strengths of the foam to the LR ABS should be such that the SR ABS/LR ABS/foam composites maintain its integrity without any substantial separation of the respective components.

The surface of the foam opposite to that bonded to the LR ABS may be bonded to materials such as metals, e.g., steel, enamelled steel, stainless steel, aluminum, wood as well as to other plastic materials. Combinations of the above such as decorative plastic overlays on metal or wood may also be used. This may be done during the foaming-in-place or in a separate step wherein the exposed foam surface of the SR ABS/LR ABS foam composite is bonded to a another material.

The following examples are set forth in illustration of the present invention and are not to be construed as a limitation thereof. Unless otherwise indicated all parts and percentages are by weight.

The SR ABS used in Example 1 and as the cap in Examples 4 to 8 was Lustran LK 286, a grade available for use as refrigerator liner for use with CFC filled foam. It is characterized as a blend of emulsion ABS (32 parts), suspension ABS (11 parts) and a separately prepared SAN matrix (57 parts). The SR ABS has a diene rubber content of about 13.5% by weight, a graft level of about 60 to 70 parts of graft to 100 parts of rubber and the SAN matrix had a S/AN weight ratio of 70/30. The RPPS of the diene rubber component is about 0.2.

The LR ABS used in Examples 3 and in Examples 5 to 8 as the substrate was Lustran LK 287, which was prepared by blending 90 parts of an ABS made by suspension polymerization with 10 parts of an ABS made by emulsion polymerization. The suspension ABS had a butadiene rubber content of about 11 to 13 percent by weight and an RPPS of about 5.5 with a substantial number of SAN occlusions in the rubber particles. The rubber was grafted with styrene (S) and acrylonitrile (AN) having an overall ratio of S/AN of about 72/28. The emulsion ABS had a diene rubber content of about 38% by weight, an RPPS of about 0.1 to 0.2 micron. The rubber was grafted with styrene (S) and acrylonitrile (AN) having an overall ratio or S/AN of about 68/32. The graft level was about seventy (70) parts graft to 100 parts of rubber and the amount of free SAN matrix formed was about 40% by weight.

The resulting RPPS of the blend was 4.2 microns. Fifty Percent of the rubber particles were less than 4.2 microns.

EXAMPLES 1 TO 3

In these Examples, extruded strips of SR ABS, refrigeration grade HIPS, and the unique LR ABS resin having thicknesses of 0.08 cm were machined into tensile specimens. The tensile specimens were then placed under constant flexural strain and placed in a desiccator. A vacuum was drawn on the desiccator and 38 cm of a blowing agent was added. After 24 hours tensile specimens were removed and tested for percent retention of unexposed elongation. Data set forth in Table I below is percent elongation retention after exposure to the blowing agent specified while under 0.5% flexural strain.

TABLE I

| | SUMMARY OF EXAMPLES 1 TO 3 | | | |
|---|---|---|---|---|
| EX- | | BLOWING AGENT | | |
| AMPLE | MATERIAL | CFC 11 | HCFC 141b | HCFC 123 |
| 1 | SR ABS | 16% | 9% | 8% |
| 2 | HIPS* | 34% | 58% | 33% |
| 3 | LR ABS | 92% | 80% | 63% |

*REFRIGERATION GRADE

Examples 1 to 3 generally show that HCFC 141b and 123 are more aggressive than CFC 11 in attacking SR ABS; refrigeration grade HIPS; and LR ABS. Examples 1 to 3 also show the superiority of LR ABS in terms of resistance to CFC 11 and the HCFC's. The LR ABS resin has been shown to have superior elongation retention after exposure to HCFC vapors in comparison to high impact polystyrene (HIPS) and standard refrigeration grade ABS (SR ABS).

Evaluation of refrigerator liner materials is normally conducted by manufacturers by thermoforming foodliners, securing them in a metal refrigerator cabinet and then foaming a polyurethane foam in place between the liner and the cabinet. An estimation of long term performance is then conducted by thermocycling the foamed unit between temperatures of 40° C. or 50° C. and −20° C. or −40° C. for a number of cycles. It has been shown that large stresses develop in the foodliner due to the differing coefficients of thermal expansion of the liner, foam, and metal cabinet. The absence of cracks and crazes along with sufficient mechanical property retention, specifically multiaxial impact and elongation retention, are used as measures of liner performance.

F—THE PROTOTYPE TEST

To simulate the stress and environmental demands placed on liner materials in an actual refrigerator, a prototype was constructed with an actual foodliner mullion in the thermoforming design. The mullion is the section of the liner between the food section and the freezer section of a refrigerator, an area of high thermal stress. The mullion section contains small radii or curvature and geometry changes resulting in high stress concentration. The prototype test consists of thermoforming the specimen, heating the forming to 50° C. along with the prototype fixture, and securing the forming to the fixture with bolts and serrated clamps while both are at 50° C. The fixture consists of an aluminum box open on one face. The polyurethane foam component containing the desired HCFC or CFC blowing agent is then introduced. The prototype is then cooled to room temperature. The prototype is then thermocycled. One thermocycle consists of −40° C. for 24 hours, 23° C. for two hours, 50° C. for 22 hours, and then back to 23° C. for two hours. The prototype is examined for cracks and blisters at each 23° C. stop. The above cycle is repeated for a total of five times. Cottonseed oil and oleic acid is sprayed on the prototype and it is then cycled two more times for a total of 7 thermocycles.

EXAMPLES 4 TO 8

Prototype liners having a thickness of about 2540 microns (2.54 mm or 100 mils) were prepared by coextruding SR ABS, optionally a regrind material comprised of SR ABS and LR ABS, and LR ABS. The liners were secured to prototype fixtures, foamed; and thermocycled as set forth above. The % thickness of each liner component layer and the blowing agent employed are listed below in Table II. Data set forth in Table II is the number of thermocycles successfully passed.

EXAMPLES 9 TO 12

Examples 9 to 12 illustrate other embodiments of the present invention. In these Examples, the SR ABS which is the interior food liner portion of the refrigerator is referred to as the cap while the LR ABS which is between the cap and the foam layer is referred to as the substrate. In Examples 10 to 12, various amounts of regrind material obtained by regrinding and recycling various coextruded composites of LR ABS substrate and an SR ABS cap are processed for use as the LR ABS substrate. These examples illustrate the need to

TABLE II
SUMMARY OF EXAMPLES 4 TO 8

| EXAMPLE | PROTOTYPE LINER MATERIAL (1) | % THICKNESS OF COMPONENT LAYERS | BLOWING AGENT THERMOCYCLES PASSED | | |
|---|---|---|---|---|---|
| | | | CFC 11 | HCFC 141 b | HCFC 123 |
| 4 | SR ABS | 100 | 7+ | 0 to 2 | 0 |
| 5 | SR ABS/LR ABS | 85/15 | (*) | 7+ | 4–7 |
| 6 | SR ABS/LR ABS | 70/30 | (*) | 7+ | 7+ |
| 7 | SR ABS/LR ASS | 50/50 | (*) | 7+ | 7+ |
| 8 | SR ABS/Regrind/LR ABS | 30/40/30 | (*) | 7+ | (*) |

(1) THE RPPS FOR SR ABS WAS ABOUT 0.2 AND ABOUT 4.2 FOR THE LR ABS. THE RPPS FOR THE REGRIND IN EXAMPLE 8 WAS OBTAINED BY REGRINDING THE COMPOSITE OF EXAMPLE 7. THIS REGRIND MATERIAL HAD AN RPPS OF ABOUT 2.2.
(*) TEST NOT RUN ON THESE SAMPLES.

Referring to Table II above, as set forth in Example 4, SR ABS prototype liners were found to pass all seven cycles with CFC 11 as the blowing agent in the polyurethane foam, yet consistently showed cracks in the first cycle with HCFC 123 as the blowing agent and within the first 3 cycles with HCFC 141b as the blowing agent. Coextruded sheets consisting of an 85/15 ratio of SR ABS to LR ABS (Example 5) consistently passed 7 cycles without cracks with HCFC 141b and passed 4–7 cycles with HCFC 123. By decreasing the ratio of the SR ABS cap to LR ABS substrate to 70/30 (Example 6) and 50/50 (Example 7) in the coextruded sheet, the prototypes consistently passed all 7 cycles with both HCFC 141b and HCFC 123 as the blowing agents without failure.

In Example 8, a three layer coextrusion system was evaluated. The three layer system incorporated a regrind layer as the middle layer and demonstrated performance results comparable to that obtained by the two layer system.

There were also improvements noted in elongation retention after foam exposure of samples machined from the prototype liners with the coextruded systems as compared to the monolayer SR ABS. Impact tests on prototype liner specimens showed a considerably smaller degree of scatter with the coextruded systems than did monolayer SR ABS with the HCFC blowing agents.

maintain a minimum level of rubber particles having a particle size over 4 microns. The prototype laminates which have a thickness of 2,540 microns or 2.54 mm (100 mils), were prepared and tested as described above for Examples 4 to 8 using HCFC 141b as the blowing agent. In addition, tensile tests were run according to ASTM D638 on the laminates after the exposure test and the elongation to fail and the range of elongation (minimum and maximum for a given set of samples) reported. The test samples were also evaluated for brittleness by flexing the prototype sample by hand after thermocycling and examining the ABS layer for cracking and for overall performance as refrigerator liner materials.

The SR ABS used as the cap in Example 9 was the same as that used in Examples 1 and 4 to 8. The SR ABS used as the cap in Examples 10 to 12 is substantially the same as that used in Example 9 except that the rubber content is about 17.5 weight percent versus about 13.5 weight percent for that SR ABS used in Example 9. The LR ABS substrate used in Examples 10 to 12 was obtained by blending the LR ABS (RPPS about 4.2 microns) used in Example 9 with various amounts of SR ABS used in Example 10 to simulate various amounts of regrind. Thus, in Example 10 the substrate contained 17% by weight of SR ABS and 83% by weight of LR ABS. In general, the more regrind used, the lower will be the RPPS of the LR ABS and fewer particles will be greater than 4 microns. The results of these Examples are tabulated in Table III below.

TABLE III
SUMMARY OF EXAMPLES 9 TO 12

| EX. | SR ABS | LR ABS (1) | % RUBBER (2) | % AN (3) | RPPS (4) | WT % RUBBER >4 microns (5) | CYCLES (6) | % ELONGATION FAIL | (RANGE) | BRITTLE | OVERALL PERFORMANCE |
|---|---|---|---|---|---|---|---|---|---|---|---|
| 9 | 0 | 100 | 16.0 | 28.3% | 4.2 | 5.6% | 7 | 28 | (24–32) | NO | GOOD |
| 10 | 17 | 83 | 15.5 | 28.6% | 3.1 | 4.8 | 7 | 55 | (35–68) | NO | GOOD |
| 11 | 38 | 62 | 16.0 | 29% | 2.5 | 3.5 | (*) | 8 | (4–10) | YES | POOR |

TABLE III-continued

SUMMARY OF EXAMPLES 9 TO 12

| EX. | SR ABS | LR ABS (1) | % RUBBER (2) | % AN (3) | RPPS (4) | WT % RUBBER >4 microns (5) | CYCLES (6) | % ELONGATION FAIL | (RANGE) | BRITTLE | OVERALL PERFORMANCE |
| --- | --- | --- | --- | --- | --- | --- | --- | --- | --- | --- | --- |
| 12 | 58 | 42 | 16.5 | 29.5% | 1.5 | 2.4 | (*) | 24 | (4–57) | YES | POOR |

(1) % BY WEIGHT OF THE SR ABS AND LR ABS IN THE SUBSTRATE
(2) % RUBBER IN SUBSTRATE INCLUDES BOTH SR ABS AND LR ABS
(3) % AN BY WEIGHT (TOTAL) IN RUBBER GRAFT AND MATRIX PHASES
(4) RPPS OF LR ABS SUBSTRATE
(5) THE WEIGHT % OF RUBBER BASED ON TOTAL WEIGHT OF SUBSTRATE HAVING A PARTICLE SIZE GREATER THAN 4 MICRONS
(6) CYCLES PASSED IN PROTOTYPE LINER EXPOSURE TEST
(*) 1 OUT OF 3 TEST SAMPLES FAILED IN LESS THAN 7 CYCLES

Referring to Table III, the RPPS and the weight percent of rubber in particles greater than 4 microns decreases from Example 9 (4.2 and 5.6%) to Example 12 (1.5 and 2.4%). The resistance of the prototype liner to the HCFC 141b blowing agent also decreases along with % elongation, brittleness and performance. This demonstrates the need for having a substantial number of rubber particles over 4 microns in which the relative demands of mechanical properties versus chemical resistance can be balanced. In the system shown, the weight percent of rubber in the substrate having a particle size greater than 4 microns should be greater than 3.5 weight percent based on the total weight of the substrate.

EXAMPLES 13 TO 16

These examples illustrate the use of an SAN matrix prepared SAN matrix (24 parts) having an AN content of 30% and a styrene (S) content of 70% by weight.

The basic component in the LR ABS substrate in Examples 13 to 16 is a suspension ABS (60 parts) having an RPPS of about 5.5, an emulsion ABS (20 parts) having an RPPS of about 0.1 to 0.2 and a separately prepared SAN matrix (20 parts) having an AN content of 42% and a styrene (S) content of 58% by weight. The overall rubber content of this material is about 15%, the overall AN content (rubber graft and matrix phases) is about 32 to 33% by weight and the RPPS is about 2.6. This material is available from Monsanto Company as Lustran LK 288. In Examples 13 to 16, the LR ABS substrate is diluted with various amounts of regrind obtained by regrinding the SR ABS cap and LR ABS substrate. The substrates used are further characterized in Table IV.

TABLE IV

SUMMARY OF EXAMPLES 13 TO 16

| EX. | LAYER RATIO (1) | % RUBBER (2) | % AN (3) | RPPS (4) | WT % RUBBER >4 microns (5) | CYCLES (6) | % ELONGATION FAIL | (RANGE) | BRITTLE | OVERALL PERFORMANCE |
| --- | --- | --- | --- | --- | --- | --- | --- | --- | --- | --- |
| 13 | 5/95 | 17.1 | 32.4 | 1.8 | 2.8 | 7 | 42 | 8–84% | NONE | GOOD |
| 14 | 20/80 | 17.4 | 33 | 1.6 | 2.4 | 7 | 33 | 11–45 | VERY SLIGHT | MARGINAL |
| 15 | 5/95 | 16.3 | 33 | 1.8 | 2.8 | 7 | 48 | 22–78 | NONE | GOOD |
| 16 | 10/90 | 16.2 | 33 | 1.6 | 2.8 | 7 | 49 | 12–64 | VERY SLIGHT | MARGINAL |

(1) RATIO OF SR ABS CAP TO LR ABS SUBSTRATE IN COEXTRUDED SHEET HAVING A THICKNESS OF ABOUT 540 MICRONS (100 MILS)
(2) % RUBBER IN SUBSTRATE INCLUDES BOTH SR ABS AND LR ABS
(3) % AN BY WEIGHT (TOTAL) IN RUBBER GRAFT AND MATRIX PHASES
(4) RPPS IS THAT OF LR ABS SUBSTRATE
(5) THE WEIGHT % RUBBER BASED ON TOTAL WEIGHT OF SUBSTRATE HAVING A PARTICLE SIZE GREATER THAN 4 MICRONS
(6) CYCLES PASSED IN THE PROTOTYPE LINER EXPOSURE TEST having an AN content of 42% and a styrene (S) content of 58% by weight as a diluent for the LR ABS as a diluent in the modified LR ABS. The use of the higher AN SAN in the range of 32 to 45% and preferably 38 to 43% allows the LR ABS material to maintain the required properties for the application at lower levels of large rubber particles, i.e. over 4 microns.

In Examples 13 and 14, the SR ABS cap is based on an emulsion ABS (45.5 parts) having a rubber level of about 38 to 40 weight percent, a suspension ABS (13 parts) having a rubber of about 11 to 13 weight percent and a separately prepared SAN matrix (40 to 42 parts) having an AN content of 42% and a styrene (S) content of 58% by weight. The overall rubber content is about 19% by weight based on the total weight of the SR ABS cap.

In Examples 15 and 16 the SR ABS cap is based on an emulsion ABS (66 parts) having a rubber level of 38 to 40 weight percent, a suspension ABS (10 parts) having a rubber level of 13% weight percent and a separately Referring to Table IV, the RPPS is in the range of 1.6 to 1.8 and weight percent of rubber particles based on the total weight of the substrate greater than 4 microns in the range of 2.4 to 2.8. These Examples demonstrate that acceptable performance may be obtained in a composite having an LR ABS substrate with an RPPS as low as 1.6 if the amount of rubber in particles greater than 4 microns is at least 2.4 weight percent based on the total weight of the substrate at the AN levels shown.

Referring to Examples 9 to 16, the overall AN level in the graft and SAN matrix components of the LR ABS substrate has been increased from about 28 to 30 weight percent in Examples 9 to 12, to about 33 weight percent in Examples 13 to 16. This slight increase allows a significant reduction in the amount of rubber particles greater than 4 microns required to maintain adequate performance in a refrigerator food liner. This is thought to be due to the separately prepared SAN matrix forming a separate continuous phase in the substrate in addition to the phases contributed by the SAN graft in the rubber and the SAN matrix phase formed during the grafting operation. The separate continuous phase is believed to be due in part to a mismatch in the AN level (about 30% by weight) in the SAN graft and matrix formed during grafting of the rubbers and that of the separately prepared SAN (about 42%).

Thus, one embodiment of the present invention calls for using an LR ABS substrate comprising (1) at least one rubber component which is grafted with SAN and wherein a SAN matrix is formed during the grafting step; and (2) a separately prepared SAN matrix having an AN level which is at least two (2) percent by weight, preferably at least five (5) percent by weight higher than the overall AN level of the SAN graft and matrix phases which are formed during the grafting step.

The rubber particles greater than 4 microns used in the above examples have come from an ABS prepared by suspension polymerization having a RPPS of about 5.5 microns. It is also possible to use suspension, bulk, mass or continuous mass polymerization methods or even emulsion agglomeration methods to obtain an ABS having a RPPS as low as 1.5 but with a substantial number of particles greater than 4 microns and an appropriate AN level in the graft and matrix phases. Such variations will be apparent to those of ordinary skill in the art upon reading the present specification.

It is apparent from the above that many modifications and changes are possible without departing from the spirit and scope of the present invention.

Having thus described the invention, what is claimed is:

1. A composite structure comprising (1) a first ABS layer comprising a high gloss, high impact ABS said first layer of ABS comprising acrylonitrile-styrene polymer as a matrix and grafted to a diene rubber substrate; (2) a second ABS layer comprising a low gloss ABS said second layer of ABS comprising acrylonitrile-styrene polymer as a matrix and grafted to a diene rubber substrate; and (3) a cellular insulation material layer wherein a major amount of the cells contain an aliphatic or cycloaliphatic halogenated hydrocarbon; wherein the second ABS layer is in contact with the cellular insulation layer and has (a) an acrylonitrile content of from 15 to 40% by weight and a styrene content of 85 to 60% by weight based on the total weight of acrylonitrile and styrene components of said ABS layer, and from 5 to 30 weight percent of diene rubber based on the total weight of said ABS layer; (b) rubber particles having a size of 4 to 10 microns; and (c) a thickness which is at least 30% of the total thickness of the combined first and second ABS layers; wherein the composite structure passes at least 7 thermocycles of the Prototype Test using HCFC 141b.

2. A composite structure as in claim 1 wherein the second ABS layer has a thickness which is at least 50% of the total thickness of the combined first and second ABS layers.

3. A composite structure as in claim 1 wherein the cells in the cellular layer contain a HCFC.

4. A composite structure as in claim 3 wherein the cells in the cellular layer contain a HCFC selected from the group consisting of HCFC 123, 141b, 22, 142b and 134a.

5. A composite structure as in claim 1 wherein the second ABS layer has a weight average rubber phase particle size diameter of at least 2.2 microns.

6. A composite structure as in claim 1 wherein at least 2.8% by weight of the rubber particles in the second ABS layer based on the total weight of the second ABS layer have a particle size greater than 4 microns.

7. A composite structure as in claim 1 wherein the second ABS layer contains a separately prepared styrene acrylonitrile matrix polymer which contains from 32 to 45% by weight of acrylonitrile.

8. A composite structure as in claim 1 wherein the second ABS layer includes a separately prepared styrene acrylonitrile matrix polymer with an acrylonitrile content which is at least 2% by weight greater than the acrylonitrile content of the styrene acrylonitrile polymer graft and matrix components formed during the grafting of the rubber substrate.

9. A composite as in claim 8 wherein the acrylonitrile content of the separately prepared styrene acrylonitrile matrix polymer is at least 5% by weight greater than the acrylonitrile content of the styrene acrylonitrile polymer graft and matrix components formed during the grafting of the rubber substrate.

10. A composite structure as in claim 8 wherein the cells in the cellular layer contain a HCFC.

11. A composite structure as in claim 8 wherein the cells in the cellular layer contain a HCFC selected from the group consisting of HCFC 123, 141b, 22, 142b and 134a.

12. A composite structure as in claim 8 wherein the second ABS layer has average rubber phase particle size diameter of at least 2.2.

13. A composite structure as in claim 8 wherein at least 2.8% by weight of the rubber particles in the second ABS layer based on the total weight of the second ABS layer have a particle size greater than 4 microns.

* * * * *

UNITED STATES PATENT AND TRADEMARK OFFICE
CERTIFICATE OF CORRECTION

PATENT NO. : 5,409,774
DATED : Apr. 25, 1995
INVENTOR(S) : Pehlert et al.

It is certified that error appears in the above-identified patent and that said Letters Patent is hereby corrected as shown below:

Column 9,

In Table II, Example 7, the word "ASS" should read, ---ABS---.

Column 9,

In Table III, Example 9, the number "16.0" should read, ---15.0---.

Signed and Sealed this

Twenty-ninth Day of August, 1995

Attest:

BRUCE LEHMAN

*Attesting Officer*    *Commissioner of Patents and Trademarks*